J. VAN.
Domestic Boiler.
No. 106,745. Patented Aug. 23, 1870.
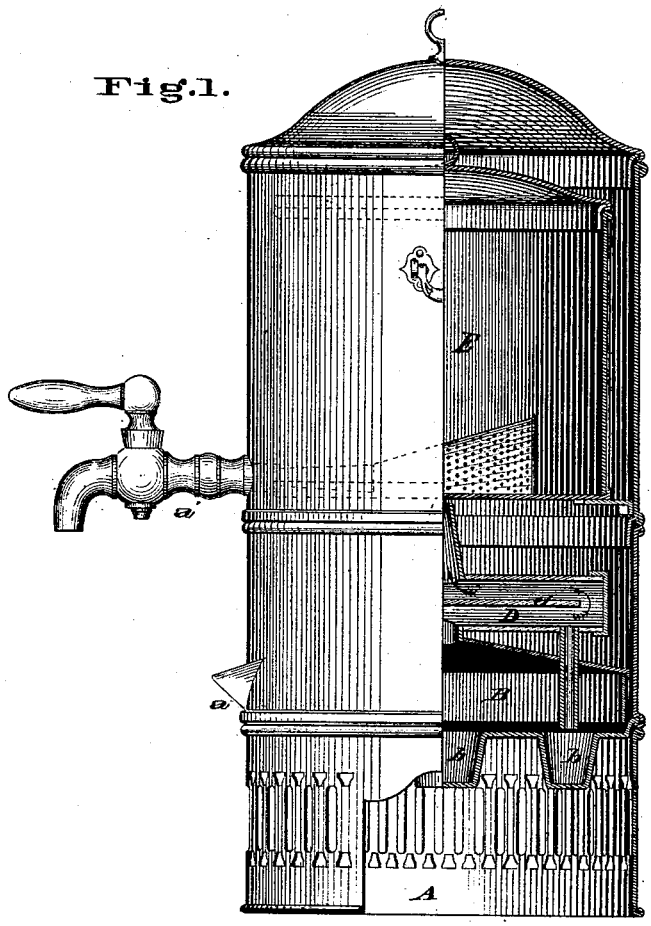
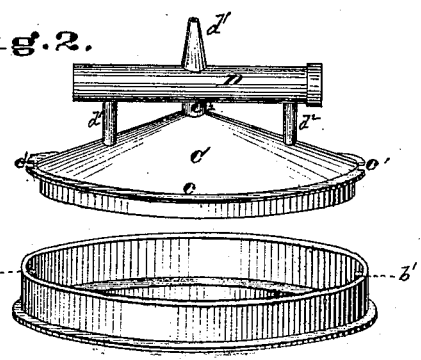

UNITED STATES PATENT OFFICE.

JOHN VAN, OF CINCINNATI, OHIO.

CULINARY APPARATUS.

Specification forming part of Letters Patent No. 106,745, dated August 23, 1870.

*To all whom it may concern:*

Be it known that I, JOHN VAN, of Cincinnati, in the county of Hamilton and State of Ohio, have invented a new and Improved Steam Cooking Apparatus; and I do hereby declare that the following is a full, clear, and exact description thereof, reference being had to the annexed drawings, making a part of this specification, in which—

Figure 1 is a side elevation of my cooking apparatus, representing one-half a vertical cross-section. Fig. 2 is a sectional view of the condenser and superheater, given in perspective.

Similar letters of reference indicate like parts.

My invention relates to an apparatus for cooking or heating food or other material by steam; and it consists of a water tank or boiler the bottom of which has pendent caps for the purpose of increasing the heating-surface; and it further consists of a cone-shaped cover or lid provided with an outlet for the steam in its center, and a condensing-partition passing longitudinally and almost throughout the length of a horizontal tube or condensing-chamber, from which the condensed steam flows back into the water-tank, while the dry steam escapes upward, where it comes in contact with the food to be cooked.

The advantage of this improvement is in the dry hot steam it supplies to the food while cooking, and does not saturate it with water, as is the case in other steam-cookers, and, second, in the economy of fuel, owing to the large amount of heating-surface presented to the fire.

I construct my steam cooker and heater in the ordinary manner, giving it a perforated pedestal, A, water-spout $a$, and faucet $a'$, except the bottom of the water-tank B, which is provided with a series of pendent caps, $b$ $b$, which present a large heating-surface to the fire. I also construct and use over the water-tank a conical cover or lid, C, provided with a flange, $c$, and two or more notches, $c'$ $c'$, which pass by and under two or more corresponding projections, $b'$, placed in the interior of the water-tank B. Directly in the apex of cone C is a tube, $c^2$, leading to and communicating with a horizontal tube or cylinder, D, and within this cylinder, and running longitudinally through the center, is a partition, $d$, leaving sufficient room between its ends and the ends of tube D for the free passage of the steam. In the center of the upper part of the tube D is a small nipple, $d'$, for the escape of the steam, and near each end of said tube are two small tubes, $d^2$, leading downward and nearly reaching the bottom of the water-tank.

In operation my invention is as follows: Food having been placed in the vessel E and water in the tank B, the cover C is placed over the water and the projections $b'$ brought over the flange $c$, which keeps the part C permanent. The apparatus is then placed over a fire or burner, as desired. When the temperature of the water rises sufficiently the steam rises and is gathered under the cone C, whence it passes up through tube $c^2$, under partition $d$, and back over the same, where it escapes in a comparatively dry and hot state from the nipple $d'$, whence it finds its way into the vessel E, containing the food. When more water is required in the tank B it may be supplied by pouring the same in at the spout $a$ without the necessity of disturbing the process.

Having thus described the construction and operation of my invention, what I claim as new, and desire to secure by Letters Patent, is—

1. A steam-cooking apparatus with cone-shaped cover C, condensing-chamber D, and partition $d$, when constructed and operating as and for the purpose specified.

2. The water-tank B, constructed with the series of caps $b$ and projections $b'$, in combination with the cover C, with notches $c'$, and a distributing device for the purposes of a steam cooking apparatus, substantially as described.

JOHN VAN.

Attest:
J. VAN KANNEL,
JNO. F. DETERS.